A. R. GUARIGLIA.
SWINGLETREE.
APPLICATION FILED SEPT. 21, 1914.
1,135,109.
Patented Apr. 13, 1915.
2 SHEETS—SHEET 1.
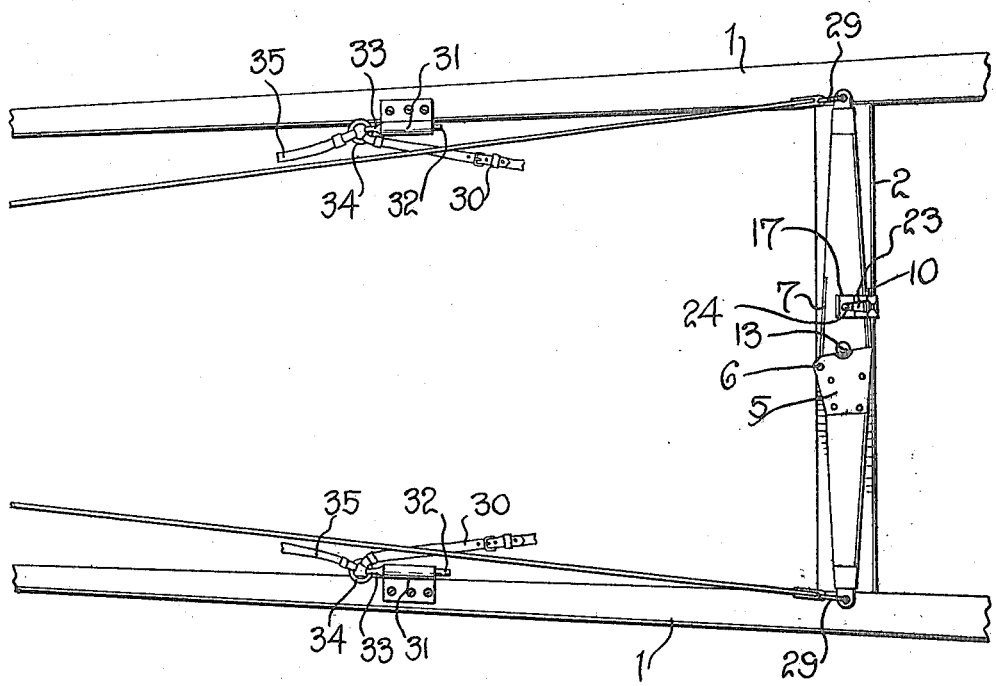
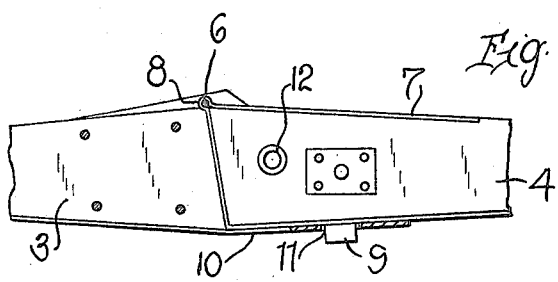
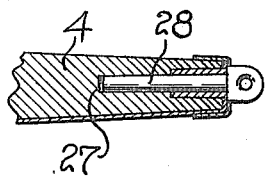
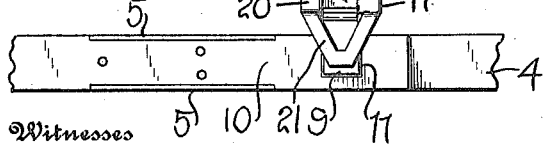
Witnesses
Robert M. Sutphen
A. L. Hied
Inventor
A. R. GUARIGLIA
By Watson E. Coleman
Attorney

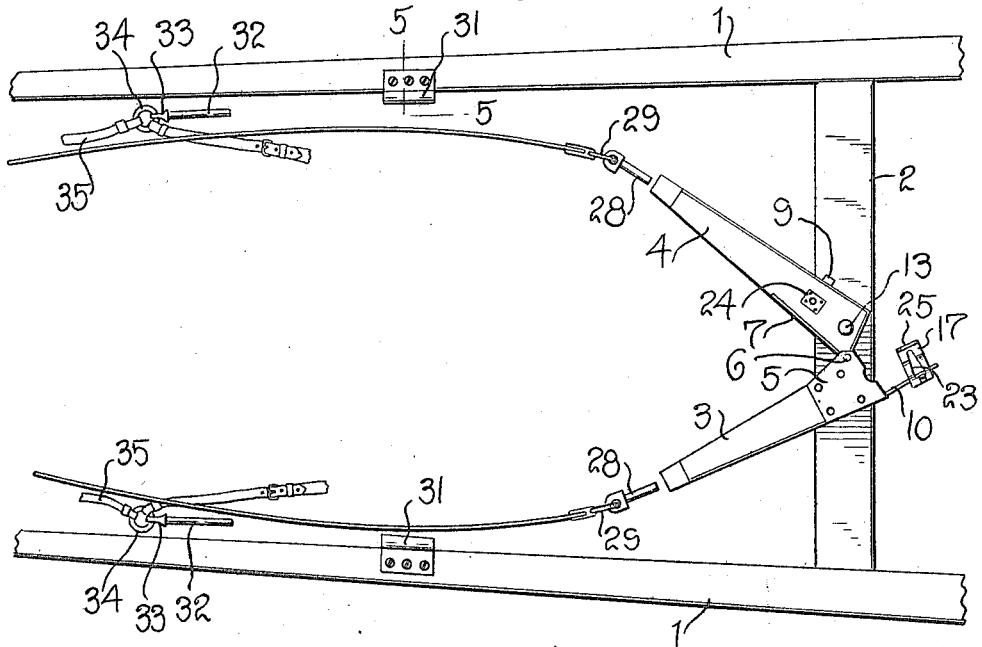
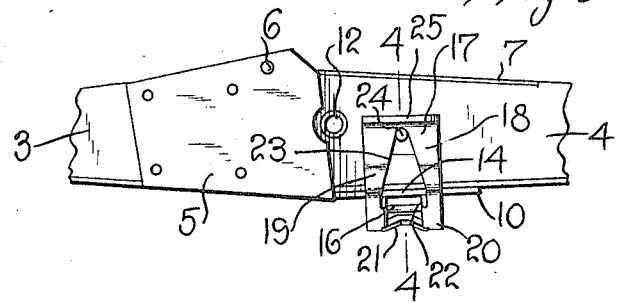
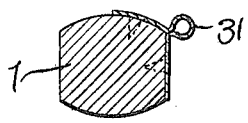
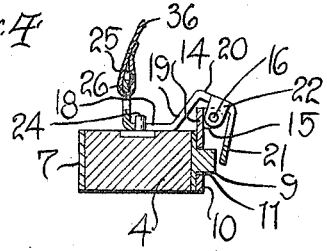

UNITED STATES PATENT OFFICE.

ANGELO R. GUARIGLIA, OF MORGANTOWN, WEST VIRGINIA.

SWINGLETREE.

1,135,109.

Specification of Letters Patent.

Patented Apr. 13, 1915.

Application filed September 21, 1914. Serial No. 862,761.

*To all whom it may concern:*

Be it known that I, ANGELO R. GUARIGLIA, a citizen of the United States, residing at Morgantown, in the county of Monongalia and State of West Virginia, have invented certain new and useful Improvements in Swingletrees, of which the following is a specification, reference being had to the accompanying drawings.

This invention relates to new and useful improvements in swingletrees and more particularly to a swingletree which is used for disconnecting the draft animal from the vehicle when the animal becomes unmanageable, the main object of the present invention being the provision of a swingletree formed in sections and pivotally mounted upon the cross bar of the thills and is provided with means whereby the sections are normally retained in longitudinal alinement and further provided with means whereby to release the retaining means when the driver has lost control of the animal to release the animal from the vehicle.

Another object of the present invention is the provision of a device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawings forming a part of this application, Figure 1 is a top plan view illustrating a swingletree constructed in accordance with my invention, the same being shown in its normal position. Fig. 2 is a similar view illustrating the device, after it has been released. Fig. 3 is a detail plan view of the central portion of the swingletree illustrating the locking member. Fig. 4 is a transverse sectional view taken on the line 4—4, Fig. 2. Fig. 5 is a transverse sectional view taken on the line 5—5, Fig. 2. Fig. 6 is a detail top plan view of the central portion of the swingletree, portions thereof being eliminated. Fig. 7 is a detail rear edge elevation, illustrating a normally operative position of the locking member; and Fig. 8 is a detail longitudinal sectional view of one end of the swingletree, illustrating the manner of mounting the removable pins.

Referring more particularly to the drawings, 1 indicates the thills which are connected, adjacent their inner ends by means of the connecting bar 2, upon which my improved swingletree is mounted.

The numerals 3 and 4 indicate the respective sections of my improved swingletree. The section 3 is provided upon opposite sides thereof at the inner ends with plates 5, the outer edges of which project beyond the outer longitudinal edge of the section and extending therethrough, is a pivot pin 6, which forms a pivot between the two sections, the section 4 being provided upon opposite edges thereof with the strap 7, said strap providing a tapering loop 8 at the inner ends thereof to receive the pivot pin 6, whereby the two sections are pivotally connected together and adapted to swing inwardly toward each other. The section 4 is provided upon one face thereof with a lug 9 and the section 3 is provided upon its inner longitudinal edge with a plate 10, the inner end of which projects on to the edge of the section 4 and is provided with an elongated opening 11, whereby to receive the lug 9, so as to retain said sections in a normally alined position.

The section 4, being somewhat longer than the section 3, is provided at its inner end with a transverse opening 12, to receive the pivot bolt 13 which pivotally connects the swingletree with the transverse bar 2, of the thills. The plate 10 which is secured to the inner longitudinal edge of the section 3 is provided upon the inner edge thereof with an outwardly projecting flange 14, having rearwardly extending spaced ears 15 in which the pivot pin 16 is mounted. Mounted for pivotal movement upon the swingletree is the locking member 17, which includes a body portion comprising spaced parallel side members integrally connected at their ends, said side members being bent to form a horizontal portion 18, an inclined portion 19 and a second horizontal portion 20, having its inner end provided with downwardly projecting tapering portions 21, adapted to be normally arranged adjacent the lug 9. The horizontal portions 20 are provided upon their inner edges with downwardly projecting perforated ears 22 which are mounted upon the pin 16 for pivotal movement. It will be noted that the inner ends of the arms forming the body of the locking member 17, converge inwardly to form a V-shaped notch 23 adapted to engage over an upwardly projecting lug 24 to securely retain the locking member in a locking position.

The upwardly projecting flange 25 formed at the inner end of the locking member is provided with an elongated recess 26, whereby to receive a releasing strap which extends rearwardly to the seat of the vehicle so as to be readily accessible to the driver. From this it will be apparent that by pulling rearwardly upon the flange 25 of the locking member, the downwardly projecting end 21 will be forced against the lug, forcing the lug 9 out of the opening 11, so that the two sections 3 and 4 may be pulled outwardly to release the animal. In order to release the animal entirely from the swingletree, the ends of the swingletree or the sections thereof are provided with longitudinally extending bores 27 in which the removable pins 28 are arranged, said pins having slotted head portions adapted to receive the trace hooks 29. From this it will be apparent that when the sections 3 and 4 are pulled to the position illustrated in Fig. 2, the pins 28 can be readily pulled from the ends of the sections so as to entirely release the animal from the vehicle.

In order to release the hold-back straps 30, I provide suitable retaining sleeves 31, which are secured to the inner sides of the thills 1 and removably arranged therein are the pins 32 having slotted heads 33 and arranged within these heads are the rings 34 to which the hold-back straps are connected. From this it will be apparent that the back pressure generally applied to the hold-backs, may be quickly applied to the thills and these hold-back straps may be quickly and readily released by having the auxiliary straps 35 applied to the outer ends of the pins, the forward movement of the draft animals readily pulling the pins 32 from the sleeves 31.

From the above description taken in connection with the accompanying drawing, the operation of my improved swingletree or horse detacher will be readily apparent as follows:—Should the draft animal become uncontrollable the driver will pull upon the releasing strap 36, forcing the tapered end 21 of the locking member against the lug 9, forcing outwardly upon the section 4 and the pulling of the animal upon the swingletree sections, will force them to the position illustrated in Fig. 2, so that the pins 28 may be quickly and readily withdrawn from the ends thereof to entirely release the traces. The hold-back straps will be readily released by forward pulling movement of the draft animals upon the auxiliary straps 35, which will remove the pins 32 from the slots 31.

It will also be apparent that the auxiliary strap 35 is provided with a suitable amount of slack so that it will not interfere with the operation of the hold-back strap, the forward ends thereof being attached to the breast strap, while the rear ends thereof are attached to the rings 34. From this it will be apparent that any draft animal attached to a buggy or other vehicle may be quickly and readily released, should the same become beyond the control of the driver.

The device, as herein shown and described, is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features, or departing from the scope of the invention, as defined by the appended claims.

Having thus described this invention, what I claim is:—

1. A device of the class described including pivotally connected sections normally disposed in longitudinal alinement, a plate secured to one of the longitudinal edges of one of the sections and projecting beyond the inner end thereof, the projecting end of said plate being provided with an opening, a lug formed upon the longitudinal edge of the other section and normally disposed within said opening to normally retain the sections in longitudinal alinement, an upwardly projecting flange formed upon said plate having spaced perforated lugs formed integral therewith, a locking member having perforated lugs adapted to be arranged in alinement with the first lugs, a pivot pin extending through said lugs to mount the locking member, and means whereby to manually actuate the locking member, the inner end thereof bearing against the lug to release the sections.

2. A device of the class described including pivotally connected sections normally disposed in longitudinal alinement, removable pins arranged in the outer ends of the sections, a plate secured to one of the longitudinal edges of one of the sections and projecting at its inner end beyond the end of the section, said plate being provided with an opening at its inner end, a lug formed on the other section at its longitudinal edge and adapted to be disposed within said opening, a second lug formed upon the upper face of the second section, a pivoted locking member carried by said plate and having a down-turned end adapted to engage the lug, said locking member having a V-shaped notch in its other end to engage the second lug and lock said plate, and means connected with the upper end of the plate and adapted to be manually operated to actuate the plate and engage one end thereof with the first lug to release the sections.

3. A swingletree including pivotally connected sections normally disposed in longitudinal alinement, a plate secured to one of the longitudinal edges of one section and projecting beyond the inner end of the other section, the projecting end of said plate having an opening, a lug formed upon the longitudinal edge of the other section and normally disposed within said opening, an upwardly projecting flange formed upon said plate, a locking member mounted upon said flange, a lug upon the upper face of the second mentioned section, said locking member having a recess to receive the second said lug, and means whereby to manually actuate the locking member, the lower end of the locking member bearing against the first mentioned lug to disengage the locking plate from the lug and release the sections.

In testimony whereof I hereunto affix my signature in the presence of two witnesses.

ANGELO R. GUARIGLIA.

Witnesses:
JOHN T. BARTALOW,
LEONARD RICH.

Copies of this patent may be obtained for five cents each, by addressing the "Commissioner of Patents, Washington, D. C."